United States Patent [19]

Schneider et al.

[11] Patent Number: 5,226,940
[45] Date of Patent: Jul. 13, 1993

[54] PROCESS FOR PRODUCING OPTICAL FIBERS OF HIGH TENSILE STRENGTH

[75] Inventors: Hartmut Schneider; Armin Staudt, both of Munich, Fed. Rep. of Germany

[73] Assignee: Siemens Aktiengesellschaft, Munich, Fed. Rep. of Germany

[21] Appl. No.: 895,429

[22] Filed: Jun. 5, 1992

Related U.S. Application Data

[63] Continuation of Ser. No. 650,997, Feb. 4, 1991, abandoned, which is a continuation of Ser. No. 347,563, May 5, 1989, abandoned, which is a continuation-in-part of Ser. No. 335,686, Apr. 10, 1989, abandoned, which is a continuation of Ser. No. 122,448, Nov. 18, 1987, abandoned.

[30] Foreign Application Priority Data

May 20, 1988 [DE] Fed. Rep. of Germany ....... 3817330

[51] Int. Cl.$^5$ ...................... C03C 15/00; C03B 37/025
[52] U.S. Cl. ........................... 65/3.11; 65/2; 65/3.15; 65/13; 65/30.1; 65/32.5; 65/900; 65/DIG. 15; 65/DIG. 16
[58] Field of Search ............ 65/2, 3.11, 3.15, 13, 65/30.1, 31, 32.5, 900, DIG. 15, DIG. 16

[56] References Cited

U.S. PATENT DOCUMENTS

| 4,065,280 | 12/1977 | Kao et al. | 65/121 |
| 4,157,906 | 6/1979 | Baily | 65/900 |
| 4,557,561 | 12/1985 | Schneider et al. | 65/DIG. 16 |
| 4,597,786 | 7/1986 | Nakai et al. | 65/DIG. 16 |
| 4,631,114 | 12/1986 | Schneider | 65/DIG. 16 |
| 4,666,486 | 5/1987 | Hutta | 65/3.11 |
| 4,729,777 | 3/1988 | Mimura | 65/DIG. 16 |
| 4,842,627 | 6/1989 | Schneider et al. | 65/3.11 |
| 4,885,019 | 12/1989 | Hutta | 65/3.11 |
| 4,911,742 | 3/1990 | Newbould et al. | 65/900 |

FOREIGN PATENT DOCUMENTS

| 0204832 | 11/1983 | Japan | 65/900 |
| 0045207 | 3/1985 | Japan | 65/DIG. 16 |

OTHER PUBLICATIONS

Schneider et al. "Fluoride Glass Etching Method for Preparation of Infrared Fibres with Improved Tensile Strength", *Electronics Letters*, Aug. 28, 1986, vol. 22, No. 18, pp. 949-950.

*Primary Examiner*—Robert L. Lindsay
*Attorney, Agent, or Firm*—Hill, Steadman & Simpson

[57] ABSTRACT

A process for producing optical fibers of high tensile strength, wherein the fiber is pulled from a glass mass of halide glass and includes surrounding the fiber and mass with a dry gas atmosphere containing a drying agent which reacts with moisture and this dry gas atmosphere includes fluorine-containing agents, in particular $NF_3$, as the drying agent.

14 Claims, 1 Drawing Sheet

PROCESS FOR PRODUCING OPTICAL FIBERS OF HIGH TENSILE STRENGTH

RELATED APPLICATIONS

This is a continuation of application Ser. No. 07/650,997, abandoned, filed Feb. 4, 1991, which was a continuation of application Ser. No. 07/347,563, abandoned, filed May 5, 1989, which is a continuation-in-part of U.S. Ser. No. 07/335,686, abandoned, filed Apr. 10, 1989, which is a continuation of Ser. No. 07/122,448, filed Nov. 18, 1987, now abandoned.

BACKGROUND OF THE INVENTION

The present invention is directed to a process for producing an optical fiber of a high tensile strength, said process includes pulling a fiber from a glass substance, surrounding the fiber and glass substance in a dry gas atmosphere containing a drying agent which reacts with moisture.

In U.S. patent application Ser. No. 122,448, filed Nov. 19, 1987, which claims priority from German Patent Application P 37 01 977.5, and whose disclosure is incorporated by reference, fibers with high tensile strength of around 600 MPa were obtained by drawing the fiber from a glass mass while in an atmosphere containing a drying agent composed of thionyl chloride, which is a chlorine-containing drying agent.

SUMMARY OF THE INVENTION

The object of the present invention is to provide a method by which fibers can be obtained which have a substantially higher strength compared with the previous strengths mentioned in the above-mentioned U.S. application.

This object is achieved with an improvement in a process of producing a fiber by pulling a glass fiber from a glass substance, and surrounding the glass substance and fiber with a dry gas atmosphere which contains a drying agent, which reacts with moisture. The improvements are that the drying agent contains a fluorine-containing agent.

With the process according to the invention, fibers having an average strength of 1,200 MPa and over are obtained. These values are at least twice as high as the previous values of 600 MPa mentioned with regard to the above-mentioned application. Such high values of 1,200 MPa and over have not yet been reported for fibers which have been produced by a process of the type mentioned in the patent application.

It should be pointed out that, although the use of fluorine-containing drying agents were suggested in the above-mentioned U.S. application with equal importance as other drying agents, no indications or results showing the surprisingly high tensile strengths which go far beyond the tensile strengths expected or achieved with the other drying agents, for example with a chlorine-containing drying agent, were achieved for the fluorine-containing drying agents disclosed in the above-mentioned U.S. application.

In view of the present invention, one explanation for the achievement of the surprisingly high tensile strengths could be that, at high temperatures used to draw the fiber from the melting mass of glass, a fluorine-containing drying agent is able to dry not only the glass surface and the atmosphere but is also able to post-fluorinate the glass surface, in contrast, to, for example, a thionyl chloride. This may be able to suppress a superficial crystallization which would produce or yield $ZrO_2$.

A particularly preferred drying agent incorporates $NF_3$ and it is very beneficial if it is solely $NF_3$. With this drying agent, it is possible to obtain fibers with a strength of more than 1,200 MPa, in particular when utilizing a ZBLA glass or a strength of at least 1123 a ZBLAN glass. It should be noted that ZBLA glass stands for a glass containing $ZrF_4$, $BaF_2$, $LaF_3$ and $AlF_3$. A ZBLAN glass contains $ZrF_4$, $BaF_2$, $LaF_3$, $AlF_3$ and $NaF$. These glasses are also suitable if other fluorine-containing agents are used.

A particular desirable composition for the ZBLA glass is composed of 57 mol. percent of $ZrF_4$, 34 mol. percent of $BaF_2$, 5 mol. percent of $LaF_3$ and 4 mol. percent of $AlF_3$.

A suitable or particularly desirable composition for the ZBLAN glass is a ZBLAN glass composed of 53 mol. percent of $ZrF_4$, 20 mol. percent $BaF_2$, 4 mol. percent of $LaF_3$, 3 mol. percent of $Alf_3$ and 20 mol. percent of $NaF$.

In addition, it is particularly beneficial to etch the fibers produced with an etchant, such as $ZrOCl_2$ solution.

Other advantages and features of the invention will be readily apparent from the following description of the preferred embodiments, the drawings and claims.

DESCRIPTION OF THE PREFERRED EMBODIMENTS

The principles of the present invention are particularly useful in a method for producing an optical fiber of high tensile strength of a halide glass, in particular an infrared-transparent fiber composed of a heavy metal fluoride glass.

Preforms composed of ZBLA and ZBLAN glass are produced in a normal manner from a high purity fluoride material, which were melted in a glassy carbon crucibles in an $SF_6$ or $NF_3$ atmosphere. Before pulling, these preforms are freed of surface crystallites which normally grow in contact with the casting mold. For this purpose, use was made of a $ZrOCl_2$ etching solution, such as described, for example, in an article by Schneider et al, "Fluoride Glass Etching Method for preparation of Infra-red Fibers with Improved Tensile Strengths", *Electronics Letter*, Vol. 22, No. 18, Aug. 28, 1986, pp. 949 and 950 and in U.S. Pat. No. 4,631,114, whose disclosure is incorporated by reference thereto. The preforms had a diameter of 10 mm and a length of 150 mm and were pulled to form fibers having a diameter of 140 $\mu m \pm 3$ $\mu m$ at a rate of 7 cm/s by exerting a force of about 0.2N. For this purpose, use was made of a furnace which had a carbon susceptor heated with a high frequency and which was flushed with $N_2$ or a mixture of $N_2$ and $NF_3$.

Figure 1:
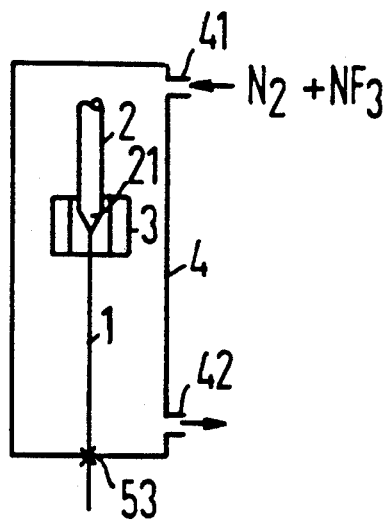
FIG. 1 is a diagrammatic presentation of a device for pulling fibers in a gas atmosphere which contains a drying agent which will react with moisture in accordance with the present invention.

An exemplary device for carrying out the pulling process is illustrated in FIG. 1. As illustrated, a lower end 21 of a rod-shaped preform 2 composed of a ZBLA or ZBLAN glass is thermally softened by the furnace and the fiber 1 is pulled down vertically from a softened end 21. The preform 2 and the furnace 3 are disposed in a sealed container 4 having, for example, an upper gas inlet 41 and a lower gas outlet 42. The lower end of the container 4 is provided with an opening 53, through which the fiber 1 is pulled.

Dry nitrogen $N_2$ or a mixture of dry nitrogen $N_2$ and $NF_3$, which is an example of a fluoride-containing drying agent which reacts with moisture, is introduced via the inlet 41. It is possible to draw off the nitrogen and the mixture, respectively, again at the lower gas outlet 42. As a result, the preform 2 and, during the pulling process, also the freshly pulled fiber 1, are surrounded by a dry gas atmosphere which contains the fluorine-containing drying agent which reacts with moisture.

Figure 2:
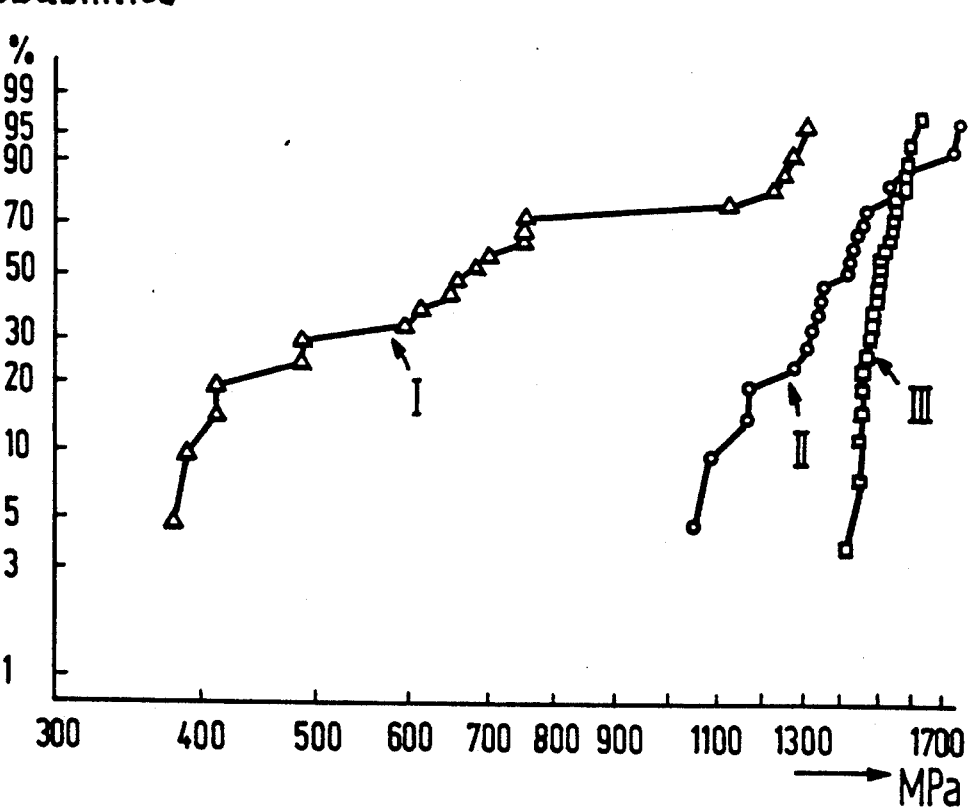
FIG. 2 is a graphic representation showing the flexural strength of the fibers composed of ZBLA glass produced by the process according to the present invention compared to fibers produced without the drying agent.

As illustrated in FIG. 2, the variations of the fracture probabilities of a fiber which has been pulled in a gas atmosphere with and without fluorine-containing drying agents is plotted against the flexural strength. The curve I relates to fibers which have been pulled in a pure $N_2$ atmosphere. The curve II illustrates the results for fibers which have been pulled in an atmosphere containing a mixture of nitrogen and $NF_3$. The curve III relates to fibers which have been pulled in the same mixture but have been additionally etched after the production of the fiber. The etching is carried out after the pulling of the fiber by etching the fiber in an etching agent, for example a $ZrOCl_2$ solution.

From the representation in FIG. 2, it is evident that when the fiber is pulled in a gas atmosphere containing a fluorine-containing drying agent, fibers are obtained which have a considerably higher strength than those obtained when the fibers are pulled in a gas atmosphere containing no fluorine-containing drying agent. The treatment with a fluorine-containing drying agent substantially eliminates defects which result in a lower strength for the fiber.

FIG. 2 relates specifically to fibers composed of ZBLA glass. As can be seen from FIG. 2, the average flexural strength is about 700 MPa for the fibers used to obtain curve I. The average flexural strength is at 1,400 MPa for the average flexural strength of the fibers according to curve II, which is already twice as high as that for the curve I. On the other hand, the average flexural strength of the fibers composing curve III is about 1,600 MPa and is still better than that for curve II.

The same improvements in the flexural strength to double the strength over that when no fluorine-containing agent is present is observed for fibers composed of ZBLAN glass, in accordance with the following table.

| Glass Composition | Atmosphere | Preparation | Fiber Diameter ($\mu$m) | Average Flexural Strength (MPa) |
|---|---|---|---|---|
| ZBLA | $N_2$ | not etched | 140 | 728 ± 306 |
| ZBLA | $N_2 + NF_3$ | not etched | 140 | 1400 ± 185 |
| ZBLA | $N_2 + NF_3$ | etched | 80 | 1585 ± 60 |
| ZBLAN | $N_2$ | not etched | 141 | 553 ± 146 |
| ZBLAN | $N_2 + NF_3$ | not etched | 143 | 852 ± 107 |
| ZBLAN | $N_2 + NF_3$ | etched | 95 | 1140 ± 29 |
| ZBLAN | $N_2 + NF_3$ | not etched | 133 | 803 ± 176 |
| (Core-sheath Fiber) | $N_2 + NF_3$ | etched | 107 | 1123 ± 136 |

It should be pointed out that, according to this table, core-sheath fibers of only slightly lower strengths are pulled, although an increase in internal crystallization density is observed at the interface between the core and sheath glass.

Best values for the flexural strength were obtained with the process according to the invention in the case of fibers composed as ZBLA glass and amount up to 1,800 MPa.

Although various minor modifications may be suggested by those versed in the art, it should be understood that we wish to embody within the scope of the patent granted hereon all such modifications as reasonably and properly come within the scope of our contribution to the art.

We claim:

1. A process for producing an infrared transparent fiber composed of a heavy-metal fluoride glass and having a tensile strength of at least 1123 MPa, said process comprising providing a gas atmosphere consisting of a drying agent which will react with moisture and dry nitrogen, providing a heated glass substance selected from a group consisting of ZBLA glass and ZBLAN glass in said gas atmosphere, pulling a fiber from the heated glass substance and forming a fiber with a tensile strength of at least 1123 MPa by providing a fluorine-containing agent as the drying agent in said atmosphere, and then, subsequently, etching the fiber in a $ZrOCl_2$ solution.

2. A process according to claim 1, wherein the drying agent incorporates a chemical substance of $NF_2$.

3. A process according to claim 2, wherein the drying agent is composed solely of $NF_3$.

4. A process according to claim 2, wherein the heated glass substance is a ZBLA glass composed of 57 mol. percent $ZrF_4$, 34 mol. percent of $BaF_2$, 5 mol. percent of $LaF_3$ and 4 mol. percent of $AlF_3$.

5. A process according to claim 2, wherein the heated glass substance is a ZBLAN glass composed of 53 mol. percent $ZrF_4$, 20 mol. percent $BaF_2$, 4 mol. percent of $LaF_3$, 3 mol. percent of $AlF_3$ and 20 mol. percent of NaF.

6. A process according to claim 3, wherein the heated glass substance is a ZBLA glass composed of 57 mol. percent of $ZrF_4$, 34 mol. percent of $BaF_2$, 5 mol. percent of $LaF_3$ and 4 mol. percent of $AlF_3$.

7. A process according to claim 3, wherein the heated glass substance is a ZBLAN glass composed of 53 mol. percent of $ZrF_4$, 20 mol. percent of $ZrF_4$, 20 mol. percent of $BaF_2$, 4 mol. percent of $LaF_3$, 3 mol. percent of $AlF_3$ and 20 mol. percent of NaF.

8. A process for producing an infrared transparent fiber composed of a heavy-metal fluoride glass and having a tensile strength of at least 1200 MPa, said process comprising providing a gas atmosphere consisting of a drying agent which will react with moisture and dry nitrogen, providing a heated glass substance consisting of ZBLA glass in said gas atmosphere, pulling a fiber from the heated glass substance and forming a fiber with a tensile strength of at least 1200 MPa by providing a fluorine-containing agent as the drying agent in said atmosphere, and then, subsequently, etching the fiber in a $ZrOCl_2$ solution.

9. A process according to claim 8, wherein the drying agent includes $NF_3$.

10. A process according to claim 9, wherein the ZBLA glass is composed of 57 mol. percent of $ZrF_4$, 34 mol. percent of $BaF_2$, 5 mol. percent of $LaF_3$ and 4 mol. percent of $AlF_3$.

11. A process according to claim 8, wherein the ZBLA glass is composed of 57 mol. percent $ZrF_4$, 34 mol. percent of $BaF_2$, 5 mol. percent of $LaF_3$ and 4 mol. percent of $AlF_3$ and the drying agent is composed solely of $NF_3$.

12. A process for producing an infrared transparent fiber composed of a heavy-metal fluoride glass and having a tensile strength of at least 1123 MPa, said process comprising providing a gas atmosphere consisting of a drying agent which will react with moisture and dry nitrogen, providing a heated glass substance of ZBLAN glass in said gas atmosphere, pulling a fiber from the heated glass substance and forming a fiber with a tensile strength of at least 1123 MPa by providing a fluorine-containing agent as said drying agent in said atmosphere, and then, subsequently, etching the fiber in a $ZrOCl_2$ solution.

13. A process according to claim 12, wherein the ZBLAN glass is composed of 53 mol. percent $ZrF_4$, 4 mol. percent of $LaF_3$, 3 mol. percent of $AlF_3$ and 20 mol. percent of NaF and the drying agent includes $NF_3$.

14. A process according to claim 13, wherein the drying agent is composed solely of $NF_3$.

* * * * *